Dec. 19, 1950 A. A. DANIELSEN ET AL 2,534,248
SHOCK ABSORBER AND ACCELERATOR
Original Filed May 8, 1944
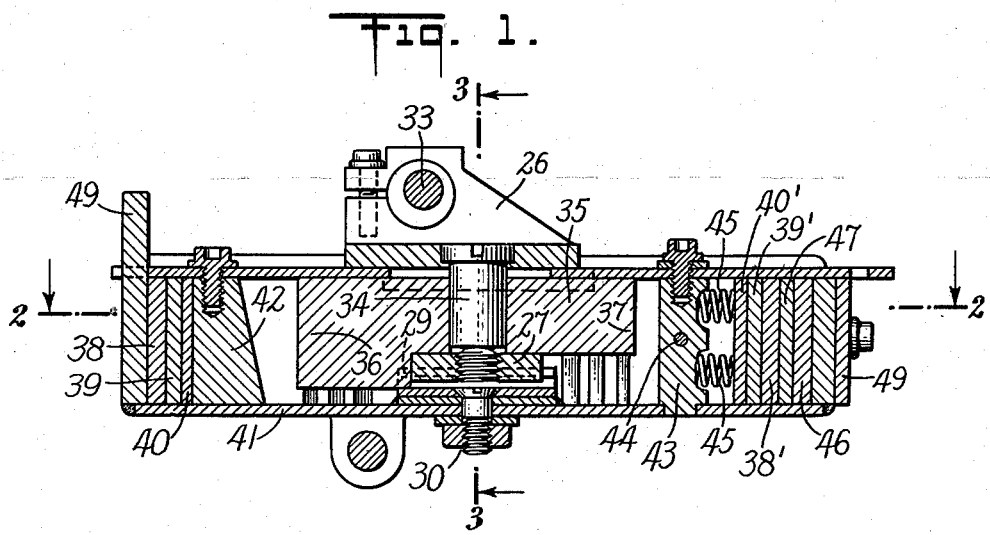
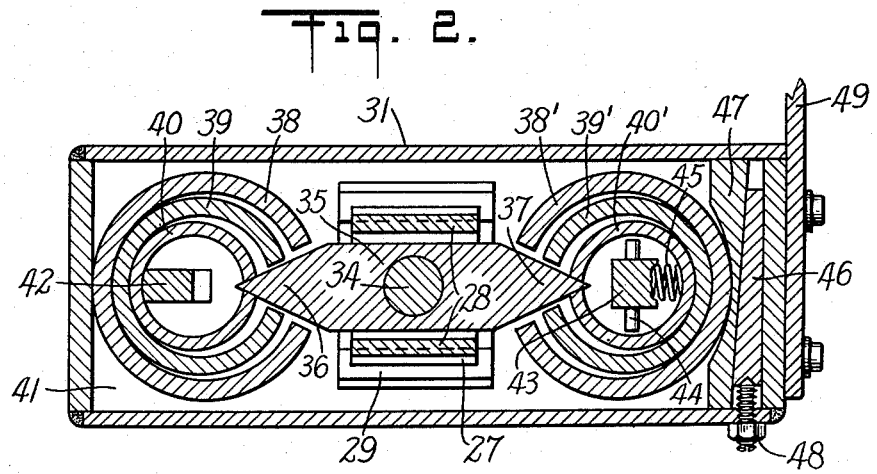
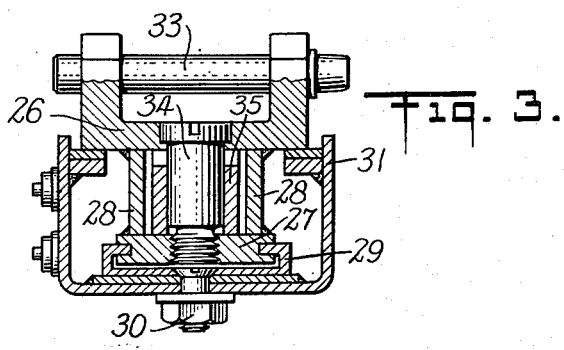
INVENTORS.
August A. Danielsen
Armand P. Schleret
BY
Blair, Curtis + Hayward
ATTORNEYS Patented Dec. 19, 1950

2,534,248

UNITED STATES PATENT OFFICE 2,534,248

SHOCK ABSORBER AND ACCELERATOR

August A. Danielsen, Rosedale, and Armand P. Schleret, Babylon, N. Y., assignors, by mesne assignments, to General Bronze Corporation, Garden City, N. Y., a corporation of New York Original application May 8, 1944, Serial No. 534,596. Divided and this application January 4, 1946, Serial No. 639,116

9 Claims. (Cl. 267—1)

The subject matter of this application is divided out of our co-pending application Serial No. 534,596, filed May 8, 1944.

The invention relates to a shock absorber, snubber and accelerator.

It is an object of the invention to provide such a device that is capable of use in connection with movable elements or parts such as reciprocating elements whose reciprocations are to be gradually arrested, and to so construct the device that it will be operable in compression as well as suspension to absorb or snub the shocks incident to the movements of the reciprocating elements and will accelerate the return of the reciprocating elements to their normal positions.

It is a further object of the invention to so construct the device that it may be adapted to, and used with, various types of reciprocating elements either to suspend, or in contradistinction, to support, a load.

In the drawings:

Figure 1 is a vertical sectional view of an embodiment of our invention;

Figure 2 is a horizontal section on the line 2—2 of Figure 1; and

Figure 3 is a section on the line 3—3 of Figure 1.

To illustrate the applicability of our device to a reciprocating element to perform, among others, the functions that have heretofore been set forth, we have illustrated the device as associated with a reciprocating gun carriage cradle such as disclosed in our said co-pending application, but it is to be understood that this is only for illustration of application.

The portion of the gun cradle shown in the drawings includes a U-shaped adapter 26 that is supported by a base 27 between which and the adapter spacers 28 extend, which spacers are rigid with the adapter and the base. The base 27 is mounted for reciprocation in the guideways 29 which are held rigidly to the bottom of the cradle by an adjustable bolt and nut 30, which cradle at this point forms a housing 31. The gun is supported by a pin 33 on the reciprocable adapter 26 so that the gun and the adapter move together on recoil and counter recoil and in relation to the housing.

In this application of our invention the bolt 34 is associated with the adapter 26 and with the elements of the shock absorber to absorb or snub the movements of the adapter and consequently of the gun and to accelerate the reciprocation of the gun in one direction after its movement in the opposite direction has been arrested.

The device of this invention includes the bolt 34 that extends between and is connected to the base 27 (when the device is used in the manner above described) and the adapter 26, and a plunger 35 that is wedge-shaped on its ends as at 36 and 37. This bolt 34 has a moving fit with the plunger 35 so that the plunger may pivot on the bolt.

The device also includes a plurality of eccentrically arranged C-springs 38, 39 and 40, which rest upon the bottom 41 of the housing 31, which is rigid with the cradle, and are loosely positioned by a rigidly mounted post 42 in the housing. The opposite end of the housing is provided with similar C-springs 38′, 39′ and 40′, which rest upon the bottom 41 of the housing but may have a different positioning means. This means as illustrated includes a rigidly mounted post 43 and pin 44 between which post and the innermost spring 40′, springs 45 are arranged this pin being of a length substantially equal to the normal inside diameter of the spring 40′, but free thereof, for the purpose of maintaining said spring and the cooperating springs 39 and 38′ against any substantial lateral displacement. These springs 45 normally tend to move the C-springs 38′, 39′ and 40′ away from the plunger 35, but this movement is limited and the positions of the C-springs are controlled by relatively adjustable cooperating wedges 46 and 47. The transverse adjustments of these wedges are made by means of an adjusting screw 48. The wedges act as a base for the C-springs 38′, 39′ and 40′ and the springs will be held against the adjacent wedge 47 under the influence of the springs 45.

In the inactive position of the plunger 35 the walls of the wedge-shaped ends 36 and 37 will contact the adjacent ends of the C-springs 40 and 40′, each of which is of less resistance than the next adjacent C-springs 39 and 39′, which in turn are of less resistance than the C-springs 38 or 38′. The graduated resistance to the movements of the plunger 35 may be accomplished in many ways, but we have shown it as accomplished by means of such springs and by making the successive springs of each set of greater thicknesses than the preceding ones.

It is of course to be understood that the C-springs of both sets may be put under initial and various compressions by means of the adjusting wedges or otherwise, even to the extent that springs 38 and 38′ will be put under such compression that the stroke of the plunger 35 and consequently the magnitude of the movement of the plunger will be limited. When only the C-springs 40 and 40′ are placed under initial compression, and while the plunger is in its inactive position, the ends of the C-springs 38 and 38' will be slightly spaced from the adjacent faces of the wedge shaped ends 36 and 37 of this plunger 35 and the ends of the C-springs 39 and 39' will be spaced from the adjacent faces of the wedge shaped ends 36 and 37 of the plunger a slightly less distance.

As the plunger 35 moves in one direction or the other under the influence of the movement of the reciprocating element which is attached to the member 34, the wedge shaped ends 36 or 37, as the case may be, separate the ends of the adjacent C-springs 40 or 40' against their resistance and will, after sufficient travel, contact the ends of the next adjacent C-springs 39 or 39' and meeting the resistance of these springs and operating against the same, will increasingly separate the ends thereof as the plunger continues its movement. Upon the further movement of the plunger the next C-springs 38, 38' will be engaged and, meeting the resistance of these springs and operating against it, will increasingly separate the ends thereof as the plunger continues its movement.

Thus the movement of the reciprocating part which is attached to the bolt 34 will be cushioned and ultimately arrested by a series of elements. There are shown and described three C-springs, but a greater or lesser number may be used or the retarder may take other forms for successively and gradually increasing the resistance to take care of variable dynamic impact loads.

It will be realized that when the adjustable wedges 46 and 47 are used the position of the springs 38', 39' and 40' will be shifted in respect of the housing in which they are mounted, while the positions of the C-springs 38, 39 and 40 will not be shifted. However, the sets of springs will bear the same relation to the plunger in any of the adjusted positions of the springs because the plunger will be shifted simultaneously along with the load to which it is attached.

In other words, regardless of the adjustment of the C-springs 38', 39' and 40', this set of springs and their counterparts 38, 39 and 40, will always exert, either initially or during the reciprocating action of the load, equal forces on the plunger.

It is of course to be understood that the resistance of the elements of each retarder may be varied to vary the effective operation of one retarder in respect to the other or the effective operation of one retarder element in relation to the corresponding element of the other retarder may be varied.

It is here pointed out that after one set of springs or retarder elements, or any thereof, have been put under compression by the movement of the plunger 35, they will exert a reactant force on the plunger with the result that the period of rest between changes of direction of motion of the plunger with its load will greatly be shortened; thus the device not only acts as a shock absorber and snubber, but also actually as an accelerator and a power conservator.

We have described the device of this invention in connection with the absorbing or snubbing and accelerations of the reciprocation of a gun merely for illustrative purposes. Thus the plunger 41 and its load will move relative to the housing 41 and the C-springs and the movements of the load will be controlled by the C-springs, whether the load be in suspension or compression. As the load moves in one direction, whether the plunger 34 be located vertically or horizontally and the other parts in their relative relationship, at the end of the movement against one of the retarders, the springs thereof tend gradually to urge the plunger and its load in the opposite direction, thus greatly shortening the period of rest between reciprocations.

We claim:

1. In a shock absorber, two relatively reciprocable elements, two nests of C-springs carried by one of said elements and arranged in spaced relation to each other with spaces between the ends of said springs facing each other, each said nest comprising a plurality of independently acting C-springs arranged with their axes substantially parallel, a plunger carried by the other of said elements and having cam shaped ends, means for securing said plunger to said carrying element in position to pass between the ends of said C-springs of said nests upon the relative reciprocation of said elements and to successively forcibly engage the said ends of the springs of each nest.

2. The combination of elements recited in claim 1 wherein the cam shaped ends of said plunger are in the form of wedges.

3. The combination of elements recited in claim 1 wherein the cam shaped ends of said plunger are in the form of wedges and the ends of the innermost spring of each nest are spaced closer together than the ends of another spring.

4. The combination of elements recited in claim 1 wherein the cam shaped ends of said plunger are in the form of wedges, the ends of the innermost spring of each nest are spaced closer together than the ends of another spring of said nest and the resistance of the latter spring is greater than that of the innermost spring.

5. In a shock absorber, two relatively reciprocable elements, a plurality of C-shaped springs carried by one of said reciprocable elements and arranged in nested relation with their ends separated and the openings between said ends in register, the axes of said springs being substantially parallel, means constructed and arranged to support said springs for independent action each of the other, and a plunger carried by the other of said reciprocable elements and having a wedge shaped end adapted to enter the spaces between the ends of said springs and to successively force the ends of said springs apart.

6. The combination of elements recited in claim 5 wherein the plunger is pivotally mounted for movement on an axis substantially parallel to the axis of said springs.

7. The combination of elements recited in claim 5 wherein the successive springs are of different degrees of resistance.

8. The combination of elements recited in claim 5 wherein the plunger is pivotally mounted for movement on an axis substantially parallel to the axis of said springs and the successive springs are of different degrees of resistance.

9. In a shock absorber two relatively reciprocable element, a plurality of C-springs having spaced ends with the openings therebetween in register each with the other, said springs being arranged in nested relation with their axes substantially parallel, means for supporting said springs for independent action each of the other, a second set of a plurality of C-springs arranged in nested relation with their axes substantially parallel and having their ends spaced each from the other with the spaces between said ends in register each with the other and facing the spaces between the springs of the first mentioned set, a plunger mounted upon the other of said elements for movement therewith and having wedge-shaped ends adapted to alternately enter the spaces between the ends of the springs of each set, and means for adjusting one set of springs as a unit to vary the distance between the two sets of springs.

AUGUST A. DANIELSEN.
ARMAND P. SCHLERET.

REFERENCES CITED

The following references are of record in the file of this patent:

UNITED STATES PATENTS

| Number | Name | Date |
|---|---|---|
| 1,169,578 | Stowasser | Jan. 25, 1916 |
| 1,908,655 | Bell | May 9, 1933 |
| 2,167,474 | Chudner | July 25, 1939 |
| 2,312,718 | Kouyoumjian | Mar. 2, 1943 |
| 2,359,915 | Hussman | Oct. 10, 1944 |
| 2,365,842 | Rosenzweig | Dec. 26, 1944 |

FOREIGN PATENTS

| Number | Country | Date |
|---|---|---|
| 542,206 | France | May 13, 1922 |
| 439,296 | Germany | Jan. 6, 1927 |